United States Patent
Wu

(10) Patent No.: US 8,305,360 B2
(45) Date of Patent: Nov. 6, 2012

(54) SENSING CIRCUIT FOR CAPACITIVE TOUCH PANEL

(75) Inventor: Tse-Hung Wu, Chu-Nan (TW)

(73) Assignee: Chimei Innolux Corporation, Chu-Nan (TW)

( * ) Notice: Subject to any disclaimer, the term of this patent is extended or adjusted under 35 U.S.C. 154(b) by 643 days.

(21) Appl. No.: 12/554,635

(22) Filed: Sep. 4, 2009

(65) Prior Publication Data

US 2010/0060610 A1 Mar. 11, 2010

Related U.S. Application Data

(60) Provisional application No. 61/095,214, filed on Sep. 8, 2008.

(30) Foreign Application Priority Data

Mar. 31, 2009 (TW) .............................. 98110713 A

(51) Int. Cl.
*G06F 3/045* (2006.01)
(52) U.S. Cl. ....................................... 345/174; 345/173
(58) Field of Classification Search .................. 345/173, 345/174
See application file for complete search history.

(56) References Cited

U.S. PATENT DOCUMENTS

| 2007/0120831 | A1* | 5/2007 | Mahowald et al. ........... 345/173 |
| 2009/0231294 | A1 | 9/2009 | Wu |
| 2010/0013779 | A1 | 1/2010 | Wu |

* cited by examiner

*Primary Examiner* — Latanya Bibbins
(74) *Attorney, Agent, or Firm* — Liu & Liu

(57) ABSTRACT

A sensing circuit for a capacitive touch panel is disclosed. By adding a path for a noise to pass through, the noise is differentially processed through two paths which have the same electrical conditions with each other. The noise is then decreased significantly, and a sensing signal can be detected correctly.

18 Claims, 6 Drawing Sheets

SENSING CIRCUIT FOR CAPACITIVE TOUCH PANEL

CROSS REFERENCE TO RELATED APPLICATION

This application claims the benefit of U.S. Provisional Patent Application Ser. No. 61/095,214, filed Sep. 8, 2008.

BACKGROUND OF THE INVENTION

1. Field of the Invention

The present invention generally relates to a sensing circuit, and more particularly to a sensing circuit for a capacitive touch panel.

2. Description of Prior Art

Applications of conventional touch panels are widely used, for example, mobile phones, touch screens for public information, automatic teller machines (ATMs) and so on. The intuitive operations of a touch panel can be substituted for the functions of a keyboard and a mouse; therefore, the touch panel is quite convenient in use.

Please refer to FIG. 1 and FIG. 2. FIG. 1 and FIG. 2 illustrate two types of capacitive touch panels 150, 250 for detecting a touch position. In FIG. 1, the capacitive touch panel 150 comprises a plurality of sensing lines in the X-axis direction and in the Y-axis direction, that is, the sensing lines $X_1$-$X_4$ and $Y_1$-$Y_4$. Each of the sensing lines $X_1$-$X_4$ and $Y_1$-$Y_4$ has a plurality of sensing electrodes (not shown). The sensing capacitance of each sensing electrode is represented as $C_{SENSE}$. When no touch event occurs, the sensing capacitance $C_{SENSE}$ is zero. When a touch event occurs, the sensing capacitance $C_{SENSE}$ is not zero. The capacitive touch panel 150 in FIG. 1 detects the touch position by sequentially scanning each of the sensing lines $X_1$-$X_4$ and $Y_1$-$Y_4$. As shown in FIG. 1, the scanning sequence is from the sensing line $X_1$ to the sensing line $X_4$, and then from the sensing line $Y_1$ to the sensing line $Y_4$. When the intersection point of the sensing line $X_4$ and the sensing line $Y_1$ is touched, for example, the touch position can be detected by a change of the sensing capacitance $C_{SENSE}$.

In the other sensing method, sensing lines in only one direction are scanned, and a stimulating signal is inputted to sensing lines in the other direction. As shown in FIG. 2, the capacitive touch panel 250 also comprises a plurality of sensing lines in the X-axis direction and in the Y-axis direction, that is, the sensing lines $X_1$-$X_4$ and $Y_1$-$Y_4$. The scanning sequence is from the sensing line $X_1$ to the sensing line $X_4$, and the stimulating signal is sequentially inputted from the sensing line $Y_1$ to the sensing line $Y_4$. That is, the stimulating signal is inputted to the sensing line $Y_1$, and the scanning sequence is from the sensing line $X_1$ to $X_4$. Then, the stimulating signal is inputted to the sensing line $Y_2$, and the scanning sequence is from the sensing line $X_1$ to $X_4$. The rest processes can be done in the same manner. A sensing capacitance $C_{TRANS}$ represents a coupling capacitance between the sensing line $X_1$ and the sensing line $Y_1$. The sensing capacitance $C_{TRANS}$ has different values at the intersection point of the sensing line $X_1$ and the sensing line $Y_1$ being touched or untouched. Similar to FIG. 1, the touch position can be detected by a change of the sensing capacitance $C_{TRANS}$.

Please refer to FIG. 3. FIG. 3 illustrates a block diagram of a conventional sensing circuit 100. The sensing circuit 100 comprises a sensing unit 102 (a sensing electrode), a sensing signal generating unit 104, and an integrator 106. The sensing unit 102 has the sensing capacitance $C_{SENSE}$ as shown in FIG. 1 or the sensing capacitance $C_{TRANS}$ as shown in FIG. 2 to indicate that a touch event has occurred or not. When the capacitive touch panel 150 in FIG. 1 or the capacitive touch panel 250 in FIG. 2 is touched, the sensing capacitance of the sensing unit 102 is changed. The sensing signal generating unit 104 generates a sensing signal according to the change of the sensing capacitance. The sensing signal is a voltage signal and inputted to the integrator 106 to be integrated. Finally, the integrator 106 outputs an integrated result, and the touch position can be determined by the integrated result.

However, regardless if it is the capacitive touch panel 150 in FIG. 1 or the capacitive touch panel 250 in FIG. 2, there exists a problem that a noise affects the sensing signal. As it is known from the prior arts, the sensing unit 102 is disposed on a sensing electrode substrate (not shown), and the sensing signal generating unit 104 and the integrator 106 are disposed on an array substrate of a liquid crystal display panel (not shown). A common electrode (not shown) is disposed between the sensing electrode substrate and the array substrate of the liquid crystal display panel for providing a required voltage level when the liquid crystal display panel operates. When the liquid crystal display panel operates, a common voltage provided by the common electrode is not clear. That is, the common voltage has the noise. For example, the noise is generated when a source bus of the liquid crystal display panel is driven to be pre-charged. In addition, the noise is also generated when switches of the liquid crystal display panel are turned on and off. The noise enters the sensing circuit 100 in FIG. 3, causing the sensing circuit 100 to fail to detect the touch position or resulting in detection errors.

Therefore, there is a need to solve the above-mentioned problem that the noise affects the sensing signal.

SUMMARY OF THE INVENTION

A primary objective of the present invention is to provide a sensing circuit for a capacitive touch panel. By adding a path for a noise to pass through, the noise is differentially processed through two paths which have the same electrical conditions with each other. The noise is then decreased significantly, and a sensing signal can be detected correctly therefore.

The sensing circuit for the capacitive touch panel according to the present invention comprises a sensing signal part, a reference signal part, and an integrator. The sensing signal part generates a sensing signal according to a capacitance of the capacitive touch panel and a noise which is received by the sensing signal part. The capacitance of the capacitive touch panel at a touched condition is different from the capacitance of the capacitive touch panel at an untouched condition. The reference signal part receives the noise and outputs a reference signal. The reference signal part has the same electrical conditions as the sensing signal part. The integrator receives the sensing signal and the reference signal, and it subtracts the reference signal from the sensing signal to generate an output signal.

The sensing circuit for the capacitive touch panel according to the present invention comprises a sensing signal path, a reference signal path, and a first differential amplifier. The sensing signal path generates a sensing signal according to a capacitance of the capacitive touch panel and a noise which is received by the sensing signal path. The capacitance of the capacitive touch panel at a touched condition is different from the capacitance of the capacitive touch panel at an untouched condition. The reference signal path receives the noise and outputs a reference signal. The reference signal path has the same electrical conditions as the sensing signal path. The first differential amplifier receives the sensing signal and the reference signal, and it subtracts the reference signal from the sensing signal to generate an output signal.

DETAILED DESCRIPTION OF THE INVENTION

Figure 1:
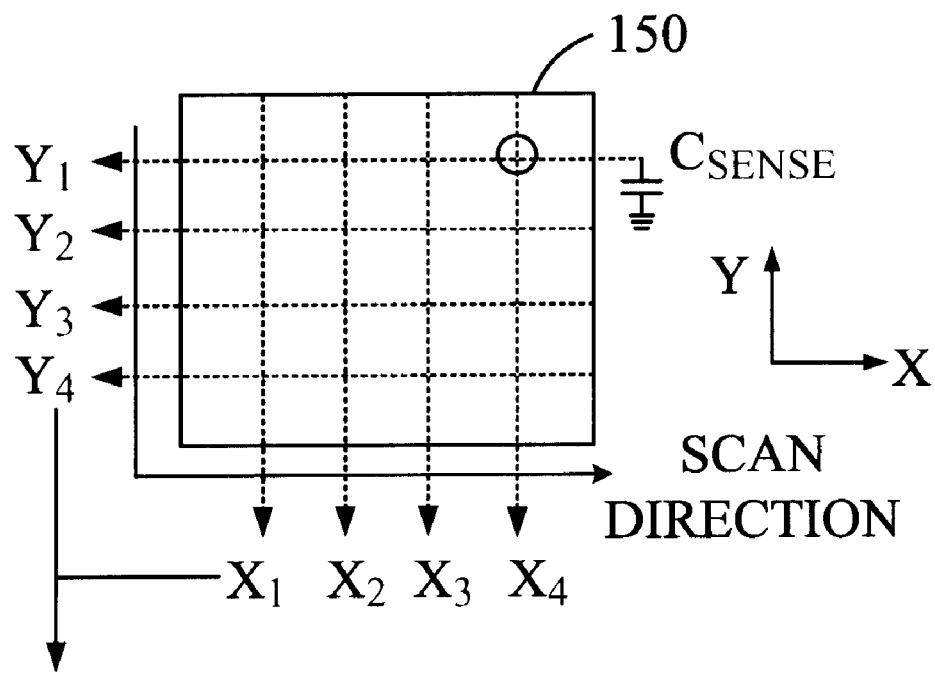
FIG. 1 and FIG. 2 illustrate two types of capacitive touch panels for detecting a touch position.
Figure 2:
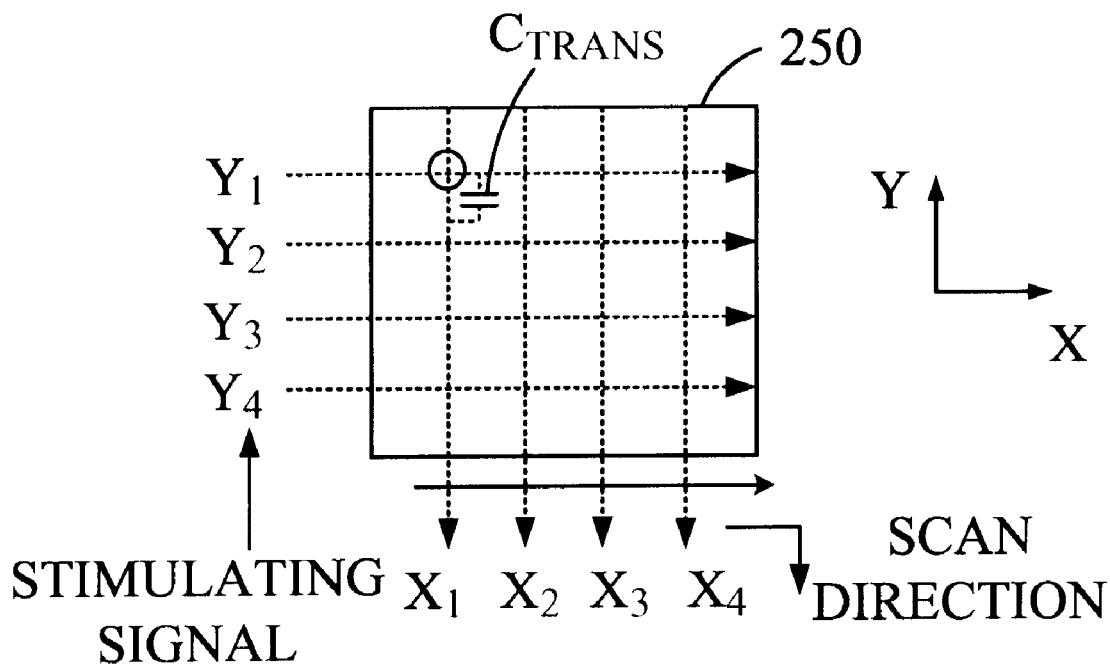
Figure 3:
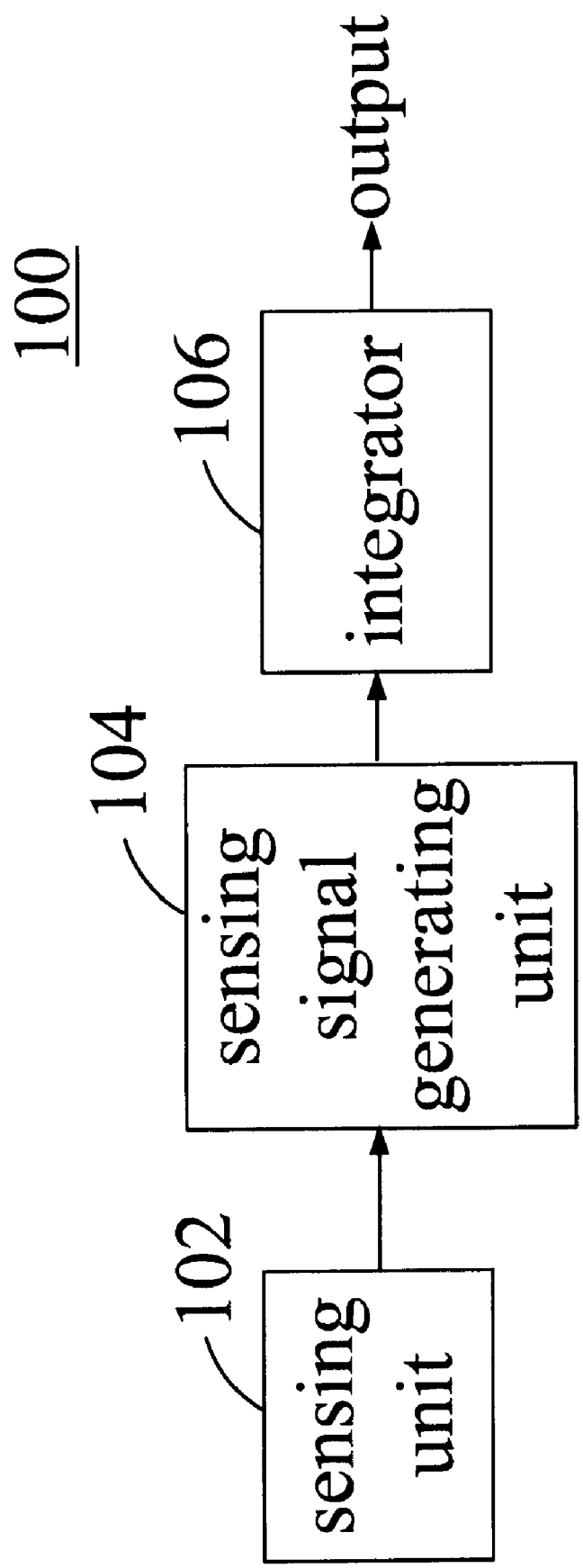
FIG. 3 illustrates a block diagram of a conventional sensing circuit.
Figure 4:
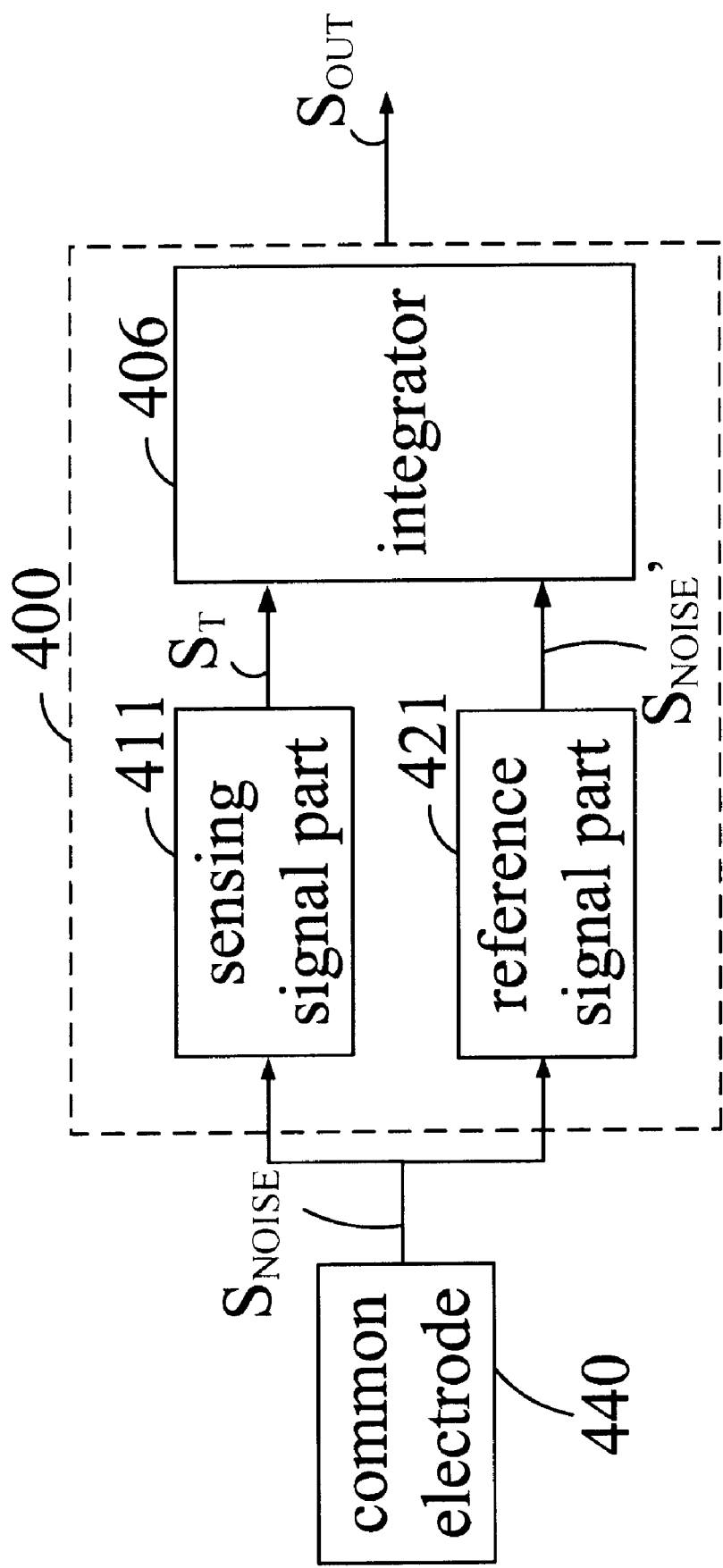
FIG. 4 illustrates a functional block diagram according to a sensing circuit of the present invention.

Please refer to FIG. 4. FIG. 4 illustrates a functional block diagram according to a sensing circuit 400 of the present invention. The sensing circuit 400 is capable of decreasing influence of a noise $S_{NOISE}$ generated by a common electrode 440 in a capacitive touch panel (not shown). The sensing circuit 400 basically comprises a sensing signal part 411, a reference signal part 421, and an integrator 406. The sensing signal part 411 generates a sensing signal $S_T$ according to a capacitance of the capacitive touch panel and the noise $S_{NOISE}$ which is received by the sensing signal part 411. The capacitance of the capacitive touch panel at a touched condition is different from the capacitance of the capacitive touch panel at an untouched condition. The reference signal part 421 receives the noise $S_{NOISE}$ and outputs a reference signal $S_{NOISE}'$. The reference signal part 421 is simulated to have the same electrical conditions as the sensing signal part 411. The integrator 406 receives the sensing signal $S_T$ and the reference signal $S_{NOISE}'$. The function of the integrator 406 is to integrate a difference between signals fed to two inputs of the integrator 406. As a result, the integrator 406 subtracts the reference signal $S_{NOISE}'$ from the sensing signal $S_T$ to generate an output signal $S_{OUT}$.

The reference signal part 421 has a capacitance substantially equal to a capacitance of the sensing signal part 411 at the untouched condition. The sensing signal part 411 and the reference signal part 421 have the same electrical conditions. This means that the reference signal part 421 has a plurality of electrical elements, and the electrical elements are connected to simulate equivalent circuits of the sensing signal part 411 so that both the reference signal part 421 and the sensing signal part 411 have approximately the same electrical characteristics, such as resistance, capacitance, and so on. The objective of the above-mentioned is to make the noise $S_{NOISE}$ pass through the same circuits so that noise values inputted to the integrator 406 are the same after the noise $S_{NOISE}$ passes the sensing signal part 411 and the reference signal part 421, respectively.

Figure 5:
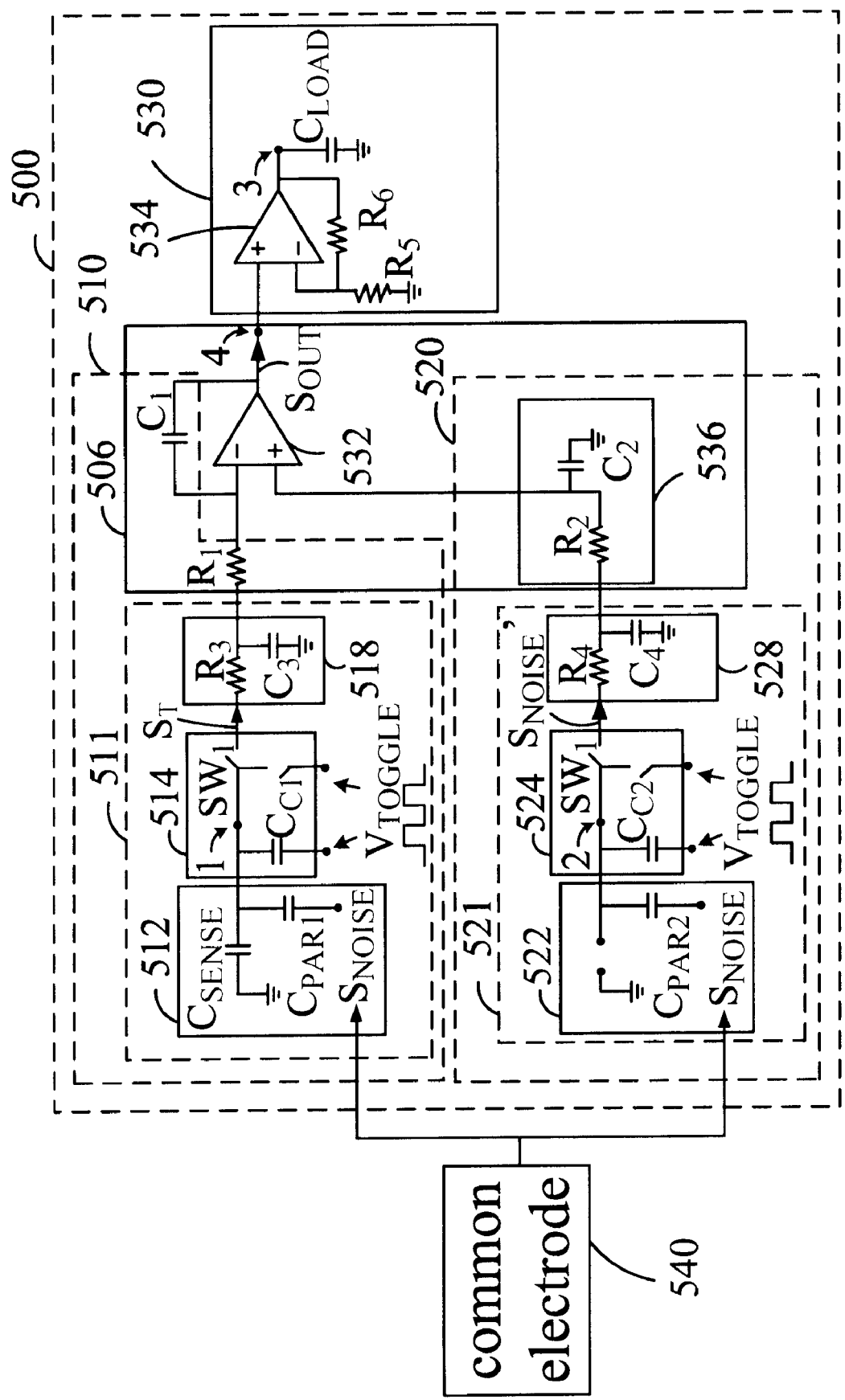
FIG. 5 illustrates a circuit diagram according to a first embodiment shown in FIG. 4.

In order to be clearly understood, the following will describe differences between the prior arts and the present invention. Please refer to FIG. 5. FIG. 5 illustrates a circuit diagram according to a first embodiment shown in FIG. 4. This embodiment is a sensing circuit 500 utilized in a capacitive touch panel where scan lines are sequentially scanned from one direction to the other direction. A sensing signal part 511 comprises a sensing unit 512 and a sensing signal generating unit 514. A reference signal part 521 comprises a reference unit 522 and a reference signal generating unit 524.

The sensing unit 512 has a sensing capacitance which is represented as $C_{SENSE}$. When the capacitive touch panel is untouched, the sensing capacitance $C_{SENSE}$ of the sensing unit 512 is zero. When the capacitive touch panel is touched, the sensing capacitance $C_{SENSE}$ is not zero. In addition, the sensing unit 512 further has a parasitic capacitance. The parasitic capacitance is an equivalent capacitance between a common electrode 540 and a sensing electrode substrate (not shown), and it is represented as $C_{PAR1}$. A noise $S_{NOISE}$ of the common electrode 540 is coupled to the sensing unit 512 through the parasitic capacitance $C_{PAR1}$.

The sensing unit 512 receives the noise $S_{NOISE}$ through the parasitic capacitance $C_{PAR1}$. The sensing unit 512 has a first equivalent capacitance or a second equivalent capacitance. The first equivalent capacitance is an equivalent capacitance of the capacitance of the capacitive touch panel at the touched condition (i.e. the sensing capacitance $C_{SENSE}$) and the parasitic capacitance $C_{PAR1}$. The second equivalent capacitance is an equivalent capacitance of the capacitance of the capacitive touch panel at the untouched condition (i.e. the sensing capacitance $C_{SENSE}$ is zero) and the parasitic capacitance $C_{PAR1}$. The sensing signal generating unit 514 is coupled to the sensing unit 512. The sensing signal generating unit 514 generates a sensing signal $S_T$ according to the first equivalent capacitance and the noise $S_{NOISE}$ or according to the second equivalent capacitance and the noise $S_{NOISE}$.

There are two parts of signals at a node 1 in FIG. 5. One part is generated by a control signal $V_{TOGGLE}$ (such as a square wave), and the other part is generated by the noise $S_{NOISE}$. The control signal $V_{TOGGLE}$ is an added signal for reacting the touched condition or the untouched condition (i.e. the sensing capacitance $C_{SENSE}$). That is, the control signal $V_{TOGGLE}$ is utilized to transform the first equivalent capacitance or the second equivalent capacitance into a signal change so as to indicate that the capacitive touch panel is touched or untouched. The control signal $V_{TOGGLE}$ is coupled to the sensing signal generating unit 514 through a first coupling capacitor $C_{C1}$. In another aspect, the noise $S_{NOISE}$ is coupled thereto through the parasitic capacitance $C_{PAR1}$ so that generates an $S_{1NOISE}$ at the node 1. The $S_{1NOISE}$ is obtained by the following equation (1):

$$S_{1NOISE} = S_{NOISE}\left(\frac{C_{PAR1}}{C_{PAR1} + C_{C1} + C_{SENSE}}\right) \quad (1)$$

The noise $S_{NOISE}$ passes through the sensing signal part 511, in addition, the present invention establishes the other path for the noise $S_{NOISE}$ of the common electrode 540 to pass through. The reference unit 522 receives the noise $S_{NOISE}$ and has a third equivalent capacitance. The third capacitance simulates the capacitance of the capacitive touch panel at the untouched condition and the parasitic capacitance $C_{PAR1}$. That is, the third equivalent capacitance is equal to the second equivalent capacitance of the sensing unit 512. Therefore, the reference unit 522 has a capacitor $C_{PAR2}$ to simulate the parasitic capacitance $C_{PAR1}$. The noise $S_{NOISE}$ is coupled to the reference unit 522 through the capacitor $C_{PAR2}$. As mentioned above, the parasitic capacitance $C_{PAR1}$ is the equivalent capacitance between the common electrode 540 and the sensing electrode substrate. The parasitic capacitance $C_{PAR1}$ can be obtained by measuring. In contrast, the capacitor $C_{PAR2}$ is an added capacitor which has the same capacitance as the parasitic capacitance $C_{PAR1}$.

The reference signal generating unit 524 has the same circuits as the sensing signal generating unit 514, and the reference signal generating unit 524 outputs a reference signal $S_{NOISE}'$ according to the third equivalent capacitance of the reference unit 522 and the noise $S_{NOISE}$. The reference signal generating unit 524 has an added second coupling capacitor $C_{C2}$. In addition to being coupled to the sensing signal generating unit 514 through the first coupling capacitor $C_{C1}$, the control signal $V_{TOGGLE}$ is also coupled to the reference signal generating unit 524 through the second coupling capacitor $C_{C2}$. Accordingly, the electrical conditions of the reference signal part 521 are the same as the electrical conditions of the sensing signal part 511. The noise $S_{NOISE}$ passes through both the reference signal part 521 and the sensing signal part 511. A capacitance of the second coupling capacitor $C_{C2}$ is substantially equal to a capacitance of the first coupling capacitor $C_{C1}$. Thus, an $S_{2NOISE}$ at a node 2 is:

$$S_{2NOISE} = S_{NOISE}\left(\frac{C_{PAR2}}{C_{PAR2} + C_{C2}}\right)$$

The capacitance of the capacitor $C_{PAR2}$ is substantially equal to the parasitic capacitance $C_{PAR1}$, the capacitance of second coupling capacitor $C_{C2}$ is substantially equal to the capacitance of the first coupling capacitor $C_{C1}$, therefore:

$$S_{2NOISE} = S_{NOISE}\left(\frac{C_{PAR1}}{C_{PAR1} + C_{C1}}\right)$$

A signal difference inputted to two inputs of the integrator 506 is:

$$S_{1NOISE} - S_{2NOISE} = S_{NOISE}\left(\frac{C_{PAR1}}{C_{PAR1} + C_{C1} + C_{SENSE}} - \frac{C_{PAR1}}{C_{PAR1} + C_{C1}}\right) \quad (2)$$

$$= S_{NOISE}\left[\frac{-C_{par1} \times C_{sense}}{(C_{PAR1} + C_{C1} + C_{SENSE}) \times (C_{PAR1} + C_{C1})}\right]$$

Comparing the $S_{1NOISE}$ of the conventional sensing circuit in the equation (1) with the ($S_{1NOISE} - S_{2NOISE}$) in the equation (2) of the first embodiment of the present invention, it is obtained that the noise in the equation (2) is decreased by a multiple of $$\left[\frac{C_{SENSE}}{(C_{PAR1} + C_{C1})}\right].$$

The noise $S_{NOISE}$ can be eliminated to increase sensitivity of the sensing circuit 500 after the integrator 506 integrates.

The sensing signal part 511 preferably comprises a first filter 518 coupled between the sensing signal generating unit 514 and the integrator 506 for filtering out high-frequency components of the sensing signal $S_T$ generated by the sensing signal generating unit 514. In order to simulate the sensing signal part 511, the reference signal part 521 preferably comprises a second filter 528 coupled between the reference signal generating unit 524 and the integrator 506. The second filter 528 has the same circuits as the first filter 518, and the second filter 528 filters out high-frequency components of the reference signal $S_{NOISE}'$.

In the present embodiment, the first filter 518 comprises a third resistor $R_3$ coupled between the sensing signal generating unit 514 and the integrator 506, and a third capacitor $C_3$ coupled between the integrator 506 and a ground. The second filter 528 comprises a fourth resistor $R_4$ coupled between reference signal generating unit 524 and the integrator 506, and a fourth capacitor $C_4$ coupled between the integrator 506 and a ground. In order to make the first filter 518 and the second filter 528 have the same circuits, a resistance of the third resistor $R_3$ is substantially equal to a resistance of the fourth resistor $R_4$, and a capacitance of the third capacitor $C_3$ is substantially equal to a capacitance of the fourth capacitor $C_4$.

The integrator 506 comprises a first differential amplifier 532, a first resistor $R_1$, and a first capacitor $C_1$. The first differential amplifier 532 has an inverting input (−), a non-inverting input (+), and an output 4. The first resistor $R_1$ is coupled between the sensing signal part 511 and the inverting input (−). The first capacitor $C_1$ is coupled between the inverting input (−) and the output 4. In order to make the two paths that the noise $S_{NOISE}$ passes through before being inputted to the two inputs of the first differential amplifier 532 the same, the integrator 506 further comprises a ground match unit 536. The ground match unit 536 is utilized to make the circuits inputted to the non-inverting input (+) the same as the circuits inputted to the inverting circuits (−). The ground match unit 536 comprises a second resistor $R_2$ and a second capacitor $C_2$. A resistance of the second resistor $R_2$ must be designed the same as a resistance of the first resistor $R_1$, and a capacitance of the second capacitor $C_2$ must be designed the same as a capacitance of the first capacitor $C_1$. The second resistor $R_2$ is coupled between the reference signal part 521 and the non-inverting input (+) of the first differential amplifier 532. The second capacitor $C_2$ is coupled between the non-inverting input (+) of the first differential amplifier 532 and a ground.

The sensing signal part 511, the first resistor $R_1$ of the integrator 506 and the first capacitor $C_1$ of the integrator 506 together constitute one complete path for the sensing signal $S_T$ to pass through. The sensing signal $S_T$ is generated according to the touched condition and the noise $S_{NOISE}$ or according to the untouched condition and the noise $S_{NOISE}$. The path can be regarded as a sensing signal path 510. The reference signal part 521, the second resistor $R_2$ of the integrator 506 and the second capacitor $C_2$ of the integrator 506 together constitute the other path for the noise $S_{NOISE}$ to pass through. The other path can be regarded as a reference signal path 520. The reference signal path 520 simulates the sensing signal path 510 so as to have the same electrical conditions as the sensing signal path 510.

The output 4 of the integrator 506 can be coupled to an amplifying unit 530 for amplifying an output signal $S_{OUT}$ generated by the integrator 506. The amplifying unit 530 comprises a second differential amplifier 534, a fifth resistor $R_5$, and a sixth resistor $R_6$. The second differential amplifier 534 comprises an inverting input (−), a non-inverting input (+), and an output 3. The non-inverting input (+) is coupled to the output 4 of the integrator 506. The fifth resistor $R_5$ is coupled between the inverting input (−) of the second differential amplifier 534 and a ground. The sixth resistor $R_6$ is coupled between the inverting input (−) of the second differential amplifier 534 and the output 3.

A switch $SW_1$ of the sensing signal generating unit 514 is utilized to switch different scan lines. Each of the scan lines comprises a plurality of sensing units 512. The remaining elements including the integrator 506, the first filter 518, the reference unit 522, the reference signal generating unit 524, the ground match unit 536, the second filter 528, and the amplifying unit 530 are shared by all the scan lines.

In practical circuit arrangements, the sensing signal generating unit 514, the first filter 518, the reference signal part 521, the integrator 506, and the amplifying unit 530 are usually disposed on the array substrate of the liquid crystal display panel or disposed apart from the array substrate of the liquid crystal display panel. As mentioned above, each sensing unit 512 is a sensing electrode in the capacitive touch panel and disposed on the sensing electrode substrate.

Figure 6:
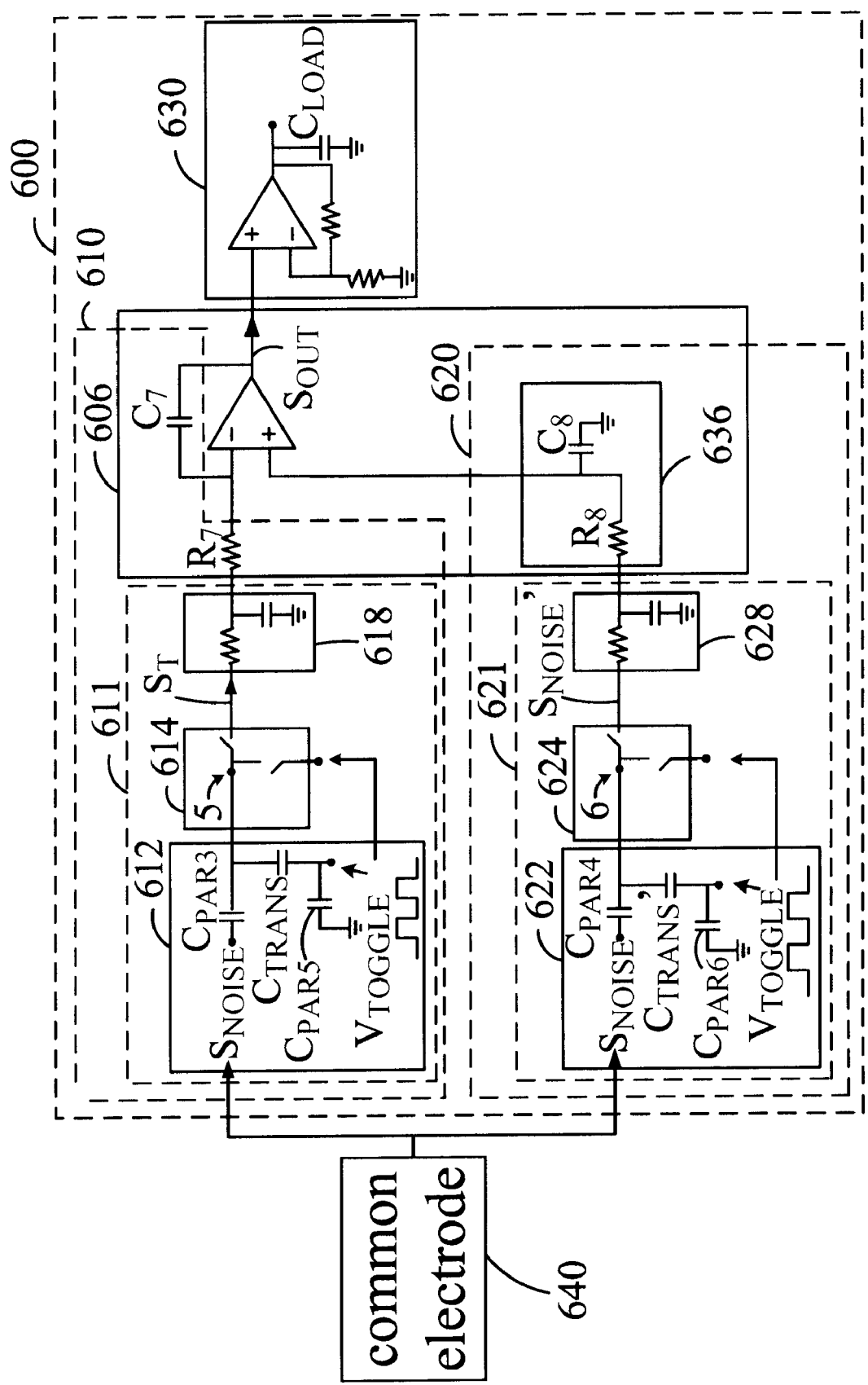
FIG. 6 illustrates a circuit diagram according to a second embodiment shown in FIG. 4.

Please refer to FIG. 6. FIG. 6 illustrates a circuit diagram according to a second embodiment shown in FIG. 4. This embodiment is a sensing circuit 600 utilized in a capacitive touch panel where scan lines in only one direction are scanned and a stimulating signal is inputted to scan lines in the other direction. A sensing signal part 611 comprises a sensing unit 612 and a sensing signal generating unit 614. A reference signal part 621 comprises a reference unit 622 and a reference signal generating unit 624.

When the capacitive touch panel is touched, the sensing unit 612 has a sensing capacitance which is represented as $C_{TRANS}$. A capacitance of the capacitive touch panel at an untouched condition, that is, the capacitance that the reference unit 622 simulates the capacitance of the capacitive touch panel at the untouched condition is represented as $C_{TRANS}'$. In addition, the sensing unit 612 further has parasitic capacitances. The parasitic capacitances are equivalent capacitances between a common electrode 640 and a sensing electrode substrate (not shown), and represented as $C_{PAR3}$ and $C_{PAR5}$. A noise $S_{NOISE}$ of the common electrode 640 is coupled to the sensing unit 612 through the parasitic capacitance $C_{PAR3}$.

The sensing unit 612 receives the noise $S_{NOISE}$ through the parasitic capacitance $C_{PAR3}$. The sensing unit 612 has a first equivalent capacitance or a second equivalent capacitance. The first equivalent capacitance is an equivalent capacitance of the capacitance of the capacitive touch panel at a touched condition (i.e. the sensing capacitance $C_{TRANS}$), the parasitic capacitance $C_{PAR3}$, and the parasitic capacitance $C_{PAR5}$. The second equivalent capacitance is an equivalent capacitance of the capacitance of the capacitive touch panel at the untouched condition (i.e. the capacitance $C_{TRANS}'$), the parasitic capacitance $C_{PAR3}$, and the parasitic capacitance $C_{PAR5}$. The sensing signal generating unit 614 is coupled to the sensing unit 612. The sensing signal generating unit 614 generates a sensing signal $S_T$ according to the first equivalent capacitance and the noise $S_{NOISE}$ or according to the second equivalent capacitance and the noise $S_{NOISE}$.

There are two parts of signals at a node 5 in FIG. 6. One part is generated by a control signal $V_{TOGGLE}$ (such as a square wave), and the other part is generated by the noise $S_{NOISE}$. The control signal $V_{TOGGLE}$ is an added signal for reacting the touched condition or the untouched condition (i.e. the sensing capacitance $C_{TRANS}$). That is, the control signal $V_{TOGGLE}$ is utilized to transform the first equivalent capacitance or the second equivalent capacitance into a signal change so as to indicate that the capacitive touch panel is touched or untouched. The control signal $V_{TOGGLE}$ is directly inputted to the sensing unit 612 and the sensing signal generating unit 614. In another aspect, the noise $S_{NOISE}$ is coupled thereto through the parasitic capacitance $C_{PAR3}$ so that generates an $S_{5NOISE}$ at the node 5. The $S_{5NOISE}$ is obtained by the following equation (3):

$$S_{5NOISE} = S_{NOISE}\left(\frac{C_{PAR3}}{C_{PAR3} + C_{TRANS}}\right) \quad (3)$$

The noise $S_{NOISE}$ passes through the sensing signal part 611, in addition, the present invention establishes the other path for the noise $S_{NOISE}$ of the common electrode 640 to pass through. The reference signal 622 receives the noise $S_{NOISE}$ and has a third equivalent capacitance. The third capacitance simulates the capacitance of the capacitive touch panel at the untouched condition ($C_{TRANS}'$), the parasitic capacitance $C_{par3}$, and the parasitic capacitance $C_{PAR5}$. That is, the third equivalent capacitance is equal to the second equivalent capacitance of the sensing unit 612. Therefore, the reference unit 622 has capacitors $C_{PAR4}$, $C_{PAR6}$ to simulate the parasitic capacitances $C_{PAR3}$, $C_{PAR5}$, respectively. The noise $S_{NOISE}$ is coupled to the reference unit 622 through the capacitor $C_{PAR4}$. As the first embodiment shown in FIG. 5, the capacitors $C_{PAR4}$, $C_{PAR6}$ are added capacitors which have the same capacitances as the parasitic capacitances $C_{PAR3}$, $C_{PAR5}$, respectively.

The reference signal generating unit 624 has the same circuits as the sensing signal generating unit 614, and the reference signal generating unit 624 outputs a reference signal $S_{NOISE}'$ according to the third equivalent capacitance of the reference unit 622 and the noise $S_{NOISE}$. In addition to being inputted to the sensing unit 612 and the sensing signal generating unit 614 directly, the control signal $V_{TOGGLE}$ is also inputted to the reference unit 622 and the reference signal generating unit 624. Accordingly, the electrical conditions of the reference signal part 621 are the same as the electrical conditions of the sensing signal part 611. The noise $S_{NOISE}$ passes through both the reference signal part 621 and the sensing signal part 611. Thus, an $S_{6NOISE}$ at a node 6 is:

$$S_{6NOISE} = S_{NOISE}\left(\frac{C_{PAR4}}{C_{PAR4} + C_{TRANS}'}\right)$$

The capacitance of the capacitor $C_{PAR4}$ is substantially equal to the capacitance of the parasitic capacitance $C_{PAR3}$, therefore:

$$S_{6NOISE} = S_{NOISE}\left(\frac{C_{PAR3}}{C_{PAR3} + C_{TRANS}'}\right)$$

A signal difference inputted to two inputs of the integrator 606 is:

$$S_{5NOISE} - S_{6NOISE} = S_{NOISE}\left(\frac{C_{PAR3}}{C_{PAR3} + C_{TRANS}} - \frac{C_{PAR3}}{C_{PAR3} + C_{TRANS}'}\right) \quad (4)$$
$$= S_{NOISE}\left[\frac{C_{PAR3} \times C_{TRANS}' - C_{PAR3} \times C_{TRANS}}{(C_{PAR3} + C_{TRANS}) \times (C_{PAR3} + C_{TRANS}')}\right]$$

Comparing the $S_{5NOISE}$ of the conventional sensing circuit in the equation (3) with the ($S_{5NOISE}-S_{6NOISE}$) in the equation (4) of the second embodiment of the present invention, it is obtained that the noise is decreased by a multiple of $$\left[\frac{C_{TRANS}' - C_{TRANS}}{(C_{PAR3} + C_{TRANS}')}\right].$$

The noise $S_{NOISE}$ can be eliminated to increase sensitivity of the sensing circuit 600 after the integrator 606 integrates.

In the practical circuits, a first filter 618, a second filter 628, the integrator 606, a ground match unit 636, and an amplifying unit 630 are the same as the first embodiment shown in FIG. 5, and are not repeated herein.

As the first embodiment shown in FIG. 5, the sensing signal part 611, a seventh resistor $R_7$ of the integrator 606 and a seventh capacitor $C_7$ of the integrator 606 together constitute one complete path for the sensing signal $S_T$ to pass through. The sensing signal $S_T$ is generated according to the touched condition and the noise $S_{NOISE}$ or according to the untouched condition and the noise $S_{NOISE}$. The path can be regarded as a sensing signal path 610. The reference signal part 621, the eighth resistor $R_8$ of the integrator 606 and the eighth capacitor $C_8$ of the integrator 606 together constitute the other path for the noise $S_{NOISE}$ to pass through. The other path can be regarded as a reference signal path 620. The reference signal path 620 simulates the sensing signal path 610 so as to have the same electrical conditions as the sensing signal path 610.

By adding the reference signal path for the noise to pass through in the present invention, the noise is inputted to the two inputs of the differential amplifier through the sensing signal path and the reference signal path which have the same electrical conditions. After the differential amplifier subtracts the noise which passes through the two paths, the noise component in the sensing signal can be decreased significantly. As a result, the output of the differential amplifier only remains the sensing signal which is generated by the sensing signal generating unit, and the sensing signal can be detected correctly so that sensitivity and accuracy of the sensing circuits are increased.

Figure 7:
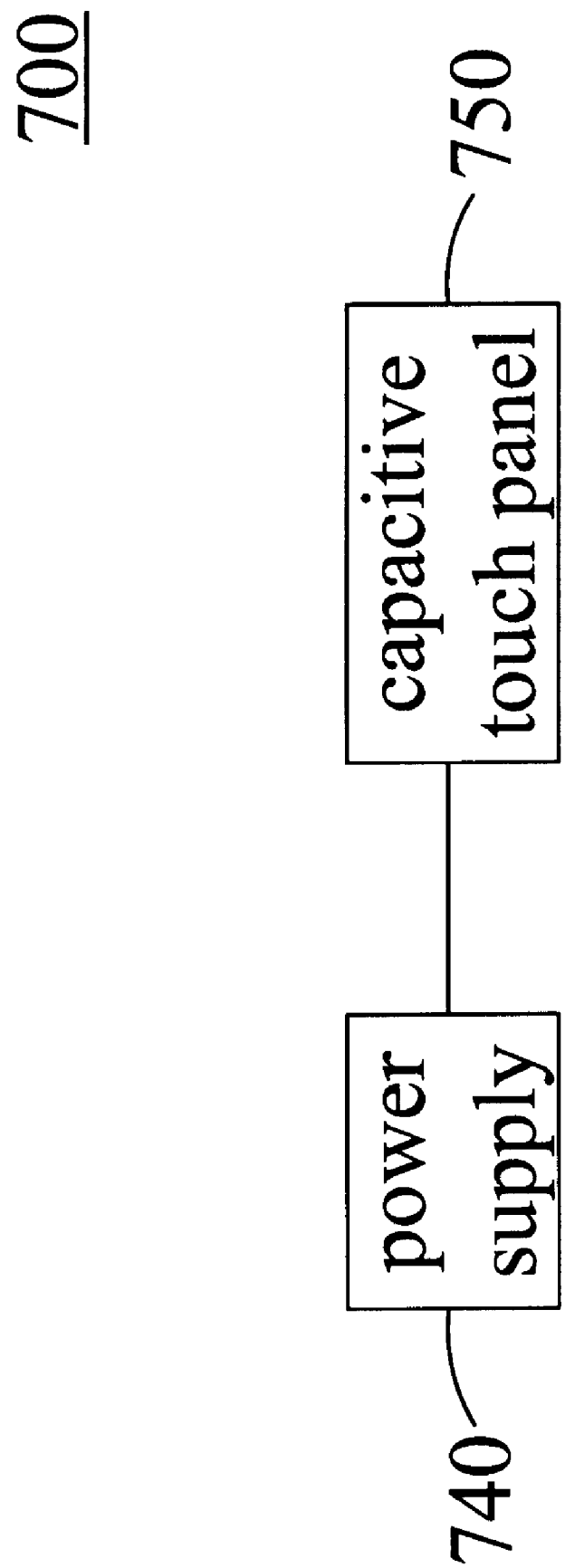
FIG. 7 illustrates a diagram of an electronic apparatus comprising a capacitive touch panel.

Please refer to FIG. 7. FIG. 7 illustrates a diagram of an electronic apparatus 700 comprising a capacitive touch panel 750. The capacitive touch panel 750 comprises one of the sensing circuits 400, 500, and 600. The capacitive touch panel 750 comprising one of the sensing circuits 400, 500, and 600 can be a part of the electronic apparatus 700. The electronic apparatus 700 comprises the capacitive touch panel 750 and a power supply 740. The power supply 740 is coupled to the capacitive touch panel 750 for providing power for the capacitive touch panel 750. The electronic apparatus is a mobile phone, a digital camera, a Personal Digital Assistant, a notebook, a desktop computer, a television, a Global Positioning System, a vehicle display, an aeronautical display, or a portable digital video disc (DVD) player.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A sensing circuit for a capacitive touch panel, comprising:
   a sensing signal part for generating a sensing signal according to a capacitance of the capacitive touch panel and a noise which is received by the sensing signal part, wherein the capacitance of the capacitive touch panel at a touched condition is different from the capacitance of the capacitive touch panel at an untouched condition, wherein the sensing signal part comprises:
      a sensing unit for receiving the noise through a parasitic capacitance, the sensing unit having a first equivalent capacitance or a second equivalent capacitance, wherein the first equivalent capacitance is an equivalent capacitance of the capacitance of the capacitive touch panel at the touched condition and the parasitic capacitance, and the second equivalent capacitance is an equivalent capacitance of the capacitance of the capacitive touch panel at the untouched condition and the parasitic capacitance; and
      a sensing signal generating unit coupled to the sensing unit, for generating the sensing signal according to the first equivalent capacitance and the noise or according to the second equivalent capacitance and the noise;
   a reference signal part for receiving the noise and outputting a reference signal, the reference signal part having the same electrical conditions as the sensing signal part, wherein the reference signal part comprises:
      a reference unit, for receiving the noise, the reference unit having a third capacitance, wherein the third capacitance simulates the capacitance of the capacitive touch panel at the untouched condition and the parasitic capacitance; and
      a reference signal generating unit coupled to the reference unit, for outputting the reference signal according to the third equivalent capacitance and the noise, wherein the reference unit has the same circuits as the sensing unit, and the reference signal generating unit has the same circuits as the sensing signal generating unit; and
   an integrator for receiving the sensing signal and the reference signal, subtracting the reference signal from the sensing signal to generate an output signal.

2. The sensing circuit of claim 1, wherein the reference signal part has a capacitance substantially equal to a capacitance of the sensing signal part at the untouched condition.

3. The sensing circuit of claim 1, wherein the reference signal part has a plurality of electrical elements, and the electrical elements are connected in a manner so as to simulate equivalent circuits of the sensing signal part.

4. The sensing circuit of claim 1, wherein the integrator comprises:
   a first differential amplifier having an inverting input, a non-inverting input, and an output;
   a first resistor having a first end coupled to the sensing signal part and a second end coupled to the inverting input; and
   a first capacitor having a first end coupled to the inverting input and a second end coupled to the output.

5. The sensing circuit of claim 4, wherein the integrator further comprises a ground match unit, the ground match unit comprises:
   a second resistor having a first end coupled to the reference signal part and a second end coupled to the non-inverting input; and
   a second capacitor having a first end coupled to the non-inverting input and a second end coupled to a ground, wherein a resistance of the second resistor is substantially equal to a resistance of the first resistor, and a capacitance of the second capacitor is substantially equal to a capacitance of the first capacitor.

6. The sensing circuit of claim 1, wherein the sensing signal part further comprises a first filter coupled between the sensing signal generating unit and the integrator for filtering out high-frequency components of the sensing signal generated by the sensing signal generating unit, and the reference signal part further comprises a second filter coupled between the reference signal generating unit and the integrator for filtering out high-frequency components of the reference signal, and the second filter has the same circuits as the first filter.

7. The sensing circuit of claim 1, further comprising:
a first coupling capacitor through which a controlling signal being coupled to the sensing signal generating unit; and
a second coupling capacitor through which the controlling signal being coupled to the reference signal generating unit, wherein a capacitance of the first coupling capacitor is substantially equal to a capacitance of the second coupling capacitor.

8. The sensing circuit of claim 1, wherein the reference unit comprises a capacitor, a capacitance of the capacitor is substantially equal to the parasitic capacitance, and the noise is coupled to the reference unit through the capacitor.

9. The sensing circuit of claim 1, further comprising an amplifying unit coupled to the integrator, for amplifying the output signal generated by the integrator.

10. An electronic apparatus, comprising a capacitive touch panel, the capacitive touch panel comprising the sensing circuit of claim 1, wherein the electronic apparatus is a mobile phone, a digital camera, a Personal Digital Assistant, a notebook, a desktop computer, a television, a Global Positioning System, a vehicle display, an aeronautical display, or a portable DVD player.

11. A sensing circuit for a capacitive touch panel, comprising:
a sensing signal path for generating a sensing signal according to a capacitance of the capacitive touch panel and a noise which is received by the sensing signal path, wherein the capacitance of the capacitive touch panel at a touched condition is different from the capacitance of the capacitive touch panel at an untouched condition, wherein the sensing signal path comprises:
a sensing unit for receiving the noise through a parasitic capacitance, the sensing unit having a first equivalent capacitance or a second equivalent capacitance, wherein the first equivalent capacitance is an equivalent capacitance of the capacitance of the capacitive touch panel at the touched condition and the parasitic capacitance, and the second equivalent capacitance is an equivalent capacitance of the capacitance of the capacitive touch panel at the untouched condition and the parasitic capacitance;
a sensing signal generating unit coupled to the sensing unit, for generating the sensing signal according to the first equivalent capacitance and the noise or according to the second equivalent capacitance and the noise,
a first resistor having a first end coupled to the sensing signal generating unit and a second end coupled to an inverting input of the first differential amplifier; and
a first capacitor having a first end coupled to the inverting input of the first differential amplifier and a second end coupled to an output of the first differential amplifier;
a reference signal path for receiving the noise and outputting a reference signal, the reference signal path having the same electrical conditions as the sensing signal path, wherein the reference signal path comprises:
a reference unit for receiving the signal, the reference unit having a third capacitance, wherein the third capacitance simulates the capacitance of the capacitive touch panel at the untouched condition and the parasitic capacitance;
a reference signal generating unit coupled to the reference unit, for outputting the reference signal according to the third equivalent capacitance and the noise;
a second resistor having a first end coupled to the reference signal generating unit and a second end coupled to a non-inverting input of the first differential amplifier; and
a second capacitor having a first end coupled to the non-inverting input of the first differential amplifier and a second end coupled to a ground,
wherein the reference unit has the same circuits as the sensing unit, the reference signal generating unit has the same circuits as the sensing signal generating unit, a resistance of the second resistor is the same as a resistance of the first resistor, and a capacitance of the second capacitor is the same as a capacitance of the first capacitor; and
a first differential amplifier for receiving the sensing signal and the reference signal, subtracting the reference signal from the sensing signal to generate an output signal.

12. The sensing circuit of claim 11, wherein the reference signal path has a capacitance substantially equal to a capacitance of the sensing signal path at the untouched condition.

13. The sensing circuit of claim 11, wherein the reference signal path has a plurality of electrical elements, and the electrical elements are connected in a manner so as to simulate equivalent circuits of the sensing signal path.

14. The sensing circuit of claim 11, wherein the sensing signal path further comprises a first filter coupled between the sensing signal generating unit and the first end of the first resistor for filtering out high-frequency components of the sensing signal generated by the sensing signal generating unit, the reference signal path further comprises a second filter coupled between the reference signal generating unit and the first end of the second resistor for filtering out high-frequency components of the reference signal, and the second filter has the same circuits as the first filter.

15. The sensing circuit of claim 11, further comprising:
a first coupling capacitor through which a controlling signal being coupled to the sensing signal generating unit; and
a second coupling capacitor through which the controlling signal being coupled to the reference signal generating unit, wherein a capacitance of the first coupling capacitor is substantially equal to a capacitance of the second coupling capacitor.

16. The sensing circuit of claim 11, wherein the reference unit comprises a capacitor, a capacitance of the capacitor is substantially equal to the parasitic capacitance, and the noise is coupled to the reference unit through the capacitor.

17. The sensing circuit of claim 11, further comprising an amplifying unit coupled to the first differential amplifier, for amplifying the output signal generated by the first differential amplifier.

18. An electronic apparatus, comprising a capacitive touch panel, the capacitive touch panel comprising the sensing circuit of claim 11, wherein the electronic apparatus is a mobile phone, a digital camera, a Personal Digital Assistant, a notebook, a desktop computer, a television, a Global Positioning System, a vehicle display, an aeronautical display, or a portable DVD player.

* * * * *